United States Patent
Lampert et al.

(10) Patent No.: US 6,663,293 B2
(45) Date of Patent: Dec. 16, 2003

(54) TUNABLE OPTICAL FIBER CONNECTOR

(75) Inventors: Norman R. Lampert, Norcross, GA (US); Wayne Lloyd Lewis, Tokyo (JP)

(73) Assignee: Fitel USA Corp., Norcross, GA (US)

( * ) Notice: Subject to any disclaimer, the term of this patent is extended or adjusted under 35 U.S.C. 154(b) by 392 days.

(21) Appl. No.: 09/811,074

(22) Filed: Mar. 16, 2001

(65) Prior Publication Data

US 2002/0131722 A1 Sep. 19, 2002

(51) Int. Cl.[7] .................................................. G02B 6/36
(52) U.S. Cl. ........................................ 385/78; 385/139
(58) Field of Search .............................. 385/78, 53, 76, 385/139; 81/461

(56) References Cited

U.S. PATENT DOCUMENTS

| | | | | |
|---|---|---|---|---|
| 4,553,814 A | * | 11/1985 | Bahl et al. ..................... | 385/86 |
| 4,738,507 A | * | 4/1988 | Palmquist .................... | 385/78 |
| 4,773,725 A | * | 9/1988 | Ashman et al. ............... | 385/87 |
| 4,832,435 A | | 5/1989 | Suzuki et al. ............. | 350/96.2 |
| 4,953,941 A | | 9/1990 | Takahashi .................. | 350/96.2 |
| 5,212,752 A | | 5/1993 | Stephenson et al. .......... | 385/78 |
| 5,233,675 A | * | 8/1993 | Cannetti ..................... | 385/75 |
| 5,481,634 A | * | 1/1996 | Anderson et al. ............. | 385/76 |
| 5,682,451 A | * | 10/1997 | Lee et al. .................... | 385/78 |
| 6,155,146 A | * | 12/2000 | Andrews et al. .............. | 81/461 |
| 6,254,278 B1 | * | 7/2001 | Andrews et al. .............. | 385/53 |
| 6,287,018 B1 | * | 9/2001 | Andrews et al. .............. | 385/60 |
| 6,307,998 B2 | * | 10/2001 | Williams Vigliaturo ..... | 385/134 |
| 6,318,903 B1 | * | 11/2001 | Andrews et al. .............. | 385/77 |
| 6,325,547 B1 | * | 12/2001 | Cammons et al. ........... | 385/76 |
| 6,464,402 B1 | * | 10/2002 | Andrews et al. .............. | 385/53 |

FOREIGN PATENT DOCUMENTS

| | | | | |
|---|---|---|---|---|
| EP | 59176714 | 10/1984 | ............ | G02B/7/26 |
| EP | 61129605 | 6/1986 | ............ | G02B/6/38 |
| EP | 1072916 A1 | 1/2001 | ............ | G02B/6/38 |
| EP | 11 072 916 A1 | 1/2001 | ............ | G02B/6/38 |
| JP | 61129605 | 6/1986 | ............ | G02B/6/38 |

* cited by examiner

*Primary Examiner*—Hae Moon Hyeon
(74) *Attorney, Agent, or Firm*—Thomas, Kayden, Horstemeyer & Risley, LLP (57) ABSTRACT

A tunable optical fiber connector has a barrel assembly within a housing in which a tubular member has mounted thereon a nut in a light press fit. The tubular member has a ferrule extending from the front thereof and, in a preferred embodiment, notches in its end for use with a tuning wrench. The outer dimensions of the nut are chosen to minimize float between the nut and the cavity that contains the nut within the housing. The connector is first roughly turned by rotation of the nut and tubular member together, and then precisely tuned by rotation of the tubular member relative to the nut.

15 Claims, 8 Drawing Sheets

Case 1  If we have a standard .100 barrel in a .110 housing, it can rotate about +/- 12 degrees
Case 2  If we change the barrel size to .108 inches in a .110 housing, it can any rotate about +/- 1.9 degrees
Case 3  If we chenge the barrel size to .109 inches in a .110 housing, it can any rotate about +/- 0.9 degrees Case 1

| BLUE    STANDARD BARREL |
|---|
| Cos30 = Adj/hypotenuse,   Hyp = Adj/Cos 30 = .050/Cos 30=   0.057735 |
|                           ≡ = x/Cos 30                 =   0.057735 in |
| Red                                                         (1.47mm) |
| 1/2 of hole dims in the direction of flats. Nominal is .110-inches.   0.055 |
| |
| Angel, Cos angle α = adj/hyp = .055/.057735 =           0.952628 |
|                                              Angel α = 17.70632 |
| The +/- rotation is 30 - 17.7 degrees, typical.  This equates to +/- 12.3 degrees.  (β) |

Case 2

| BLUE   BIG BARREL,.001 Clearance around the barrel (.002 difference) |
|---|
| Cos30 = Adj/hypotenuse,   Hyp = Adj/Cos 30 = .054/Cos 30=   0.062354 in |
|                                                               (1.58mm) |
| |
| Angel, Cos angle α = adj/hyp = .055/.062354 =           0.882063 |
|                                              Angel α = 28.10778 |
| The +/- rotation is 30 - 28.1 degrees, typical.  This equates to +/- 1.9 degrees.  (β) |

Case 3

| BLUE   BIG BARREL,.0005 Clearance around the barrel (.001 difference) |
|---|
| Cos30 = Adj/hypotenuse,   Hyp = Adj/Cos 30 = .0545/Cos 30=   0.062931 in |
|                                                               (1.60mm) |
| |
| Angel, Cos angle α = adj/hyp = .055/.062931 =           0.873971 |
|                                              Angel α = 29.07662 |
| The +/- rotation is 30 - 29.1 degrees, typical.  This equates to +/- 0.9 degrees.  (β) |

TUNABLE OPTICAL FIBER CONNECTOR

RELATED APPLICATIONS

This application is related to U.S. patent application Ser. No. 09/363,908, now U.S. Pat. No. 6,464,402, of Andrews, et al., issued Oct. 15, 2002, Ser. No. 09/363,906, now U.S. Pat. No. 6,287,018 of Andrews, et al, issued Sep. 11, 2001, which were both filed on Jul. 28, 1999, and U.S. Pat. No. 6,155,146 of Andrews et al, issued Dec. 5, 2000, the disclosures of which are incorporated herein by reference.

FIELD OF THE INVENTION

This invention relates to optical fiber connector calibration and, more particularly to a tunable optical fiber connector for use in tunable calibrating jumper terminations.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Alignment of these small diameter fibers is extremely difficult to achieve, which is understandable when it is recognized that the mode field diameter MFR of, for example, a singlemode fiber is approximately nine (9) microns (0.009 mm). The MFR is slightly larger than the core diameter. Good alignment (low insertion loss) of the fiber ends is a function of the transverse offset, angular alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

Alignment variations between a pair of connectors are the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage and is made up of three vectors. It is often the case, generally, that the ferrule passage is not concentric with the outer cylindrical surface of the ferrule (vector I), which is the reference surface. Also, the optical fiber may not be centered within the ferrule passage (vector II whose magnitude is the diametrical difference divided by two) and, also, the fiber core may not be concentric with the outer surface of the fiber (vector III). Hence eccentricity can be the result of any one or all of the foregoing. The resultant eccentricity vector has two components, magnitude and direction. Where two connectors are interconnected, rotation of one of them will, where eccentricity is present, change the relative position of the fiber cores, with a consequent increase or decrease in the insertion loss of the connections. Where the magnitude of the eccentricities are approximately equal the direction component is governing, and relative rotation of the connectors until alignment is achieved will produce maximum coupling.

There are numerous arrangements in the prior art for "tuning" a connector, generally by rotation of its ferrule, to achieve an optimum direction of its eccentricity. One such arrangement is shown in U.S. Pat. No. 5,481,634 of Anderson et al., wherein the ferrule is held within a base member that maybe rotated to any of four rotational or eccentricity angular positions. In U.S. Pat. No. 4,738,507 of Palmquist there is shown a different arrangement and method for positioning two connectors relative to each other for minimum insertion loss or maximum coupling. The arrangements of these patents are examples of the efforts to achieve optimum reliable coupling, there being numerous other arrangements and methods.

In such arrangements for achieving optimum coupling with connectors having different magnitudes and directions of eccentricities, the tuning takes place, usually, if not always, prior to the final assembly of the connector. As a consequence, an installer in the field has no control over the degree of coupling, other than by trial and error. Further, tuning of the connector cannot be performed after production of the connector is completed. Thus tuning prior to final assembly of the conductor is a step in the production process.

In U.S. Pat. No. 6,287,018 of Andrews et al. there is shown a tunable optical fiber connector which can be tuned for optimum performance after the connector has been fully assembled, and, as a consequence, greatly reduces production costs, imparts greater reliability, and gives an installer in the field of measure of control of the connections being made.

The connector of that application has an enlarged barrel member, preferably hexagonal in shape, or alternatively has six slots about the periphery, thereby establishing six rotational positions for tuning the connector. A tuning test tool is provided for optimal tuning of the connector by means of a test jumper connector having a known eccentricity vector of predetermined magnitude and direction. The barrel of the connector under test is rotated to that one of the six positions that yields maximum signal transmission or minimum insertion loss. The arrangement, for optimum tuning, requires a test jumper of extreme accuracy, preferably having a magnitude of its eccentricity vector greater than the eccentricity magnitude of the connector being tuned, and either a 0° or 180° radial position. Such test jumpers are found within the laboratory, or by being one of a large number of jumpers of which only one or two may meet the desired vector requirements. Thus a usable test jumper is a rarity and, when found, is to be carefully preserved. Such test jumpers are, for these reasons, comparatively quite expensive. Thus a readily reproducible test jumper is a desirable tool.

SUMMARY OF THE INVENTION

The present invention is a tunable optical fiber connector for producing extremely accurate tuning jumpers, for example, which can be produced on demand, or on a production basis. The connector also makes possible ultra low-loss fiber connectors by the exceptionally accurate tuning thereof, and is also useful in polarization maintaining PM fiber applications.

The principles of the present invention are shown as embodied in an LC type connector for singlemode fibers, but it is to be understood that they are equally applicable to other types of connectors such as, for example, SC, FC, MU, and ST type connectors, as well as other fiber optic devices.

The connector of the invention which, for purposes of illustration of a preferred embodiment is a modified LC type connector as shown in U.S. Pat. No. 5,481,634 of Anderson et al., the disclosure of which is incorporated by reference herein, comprises a barrel-ferrule assembly for holding the end of an optical fiber extending axially therethrough and a housing for the assembly, a coil spring member contained within the housing surrounds the barrel, which is of tubular configuration and bears against an interior wall of the housing and an enlarged flange member on the barrel, thereby supplying forward bias to the barrel-ferrule assembly relative to the housing. As is shown in the aforementioned U.S. patent applications, the barrel-ferrule assembly, the enlarged flange member is hexagonal in shape and has a tapered or chamfered leading surface that may be slotted. The housing, in turn, has a hexagonally shaped cavity, which provides any of six rotational positions for the flange and a tapered seating surface for the tapered surface of the flange. The dimensions of the cavity are such that the hexagonal barrel flange floats within the hexagonal cavity, in the Anderson et al. arrangement and can rotate about ±12°, which diminishes the tuning accuracy. Additionally, the flange is affixed to the barrel, hence the barrel has only six positions, which are subject to the uncontrolled float.

In accordance with the present invention, the barrel of a connector comprises an elongated cylindrical member having, at its front end, a recess into which the fiber containing ferrule fits and is affixed thereto. The extreme end of the cylindrical member is in this illustrative embodiment slotted to accommodate an adjusting tool, such as the tuning wrench shown in the aforementioned U.S. Pat. No. 6,155,146 of Andrews et al. Immediately adjacent the slotted end is a cylindrical surface that ends in a flange, preferably integral with the cylindrical member. An enlarged tuning member such as a hexagonal tuning nut is bored to be a light press fit on the cylindrical surface and buts against the flange which functions as a locating stop. The front face of the tuning nut member is tapered in the manner disclosed in the aforementioned U.S. application and in U.S. Pat. No. 6,155,146 to fit within a tapered recess in the connector housing. By "light press fit" is meant a press fit sufficiently tight to prevent accidental movement of the two parts relative to each other, but which with application of torque permits relative rotary movement therebetween in tuning the connector. Further, in accordance with the invention, the flats on the tuning nut are enlarged to where there is barely a sliding fit of approximately 0.0005 inches to 0.001 inch clearance between the hexagonal tuning nut flat and the hexagonal bore flat within the connector housing. As will be explained in detail hereinafter, such reduction in clearance between the flats in the housing recess and the flats on the hex tuning nut produces a drastic reduction in angular float.

In tuning the connector terminating a fiber and with the barrel of the invention mounted therein, the tuning steps described in the aforementioned pending patent applications are in U.S. Pat. No. 6,155,146 are, basically, followed. Utilizing the tuning tool and the tuning wrench of those applications, a known jumper cable and connector is used to tune the connector of the present invention, by the method therein shown. Inasmuch as there are preferably six angular positions, for an ordinary connector there are 60° positioned increments, which produces sufficiently acceptable tuning. However, for a jumper test cable and connector, as well as for PM fiber connectors, this is not nearly precise enough. Thus, in the tuning process, the closest angular position of the barrel in the connector is determined and then the barrel position is fine-tuned by using the slots in the front of the cylindrical member and the wrench, for example, to apply sufficient torque to overcome the light press fit to rotate the cylindrical member relative to the hexagonal nut, which is held in fixed position in the hexagonal recess in the connector housing, until the optimum position is reached. Because the float is very slight, as discussed hereinbefore, the optimum position can be obtained within very small tolerances. As will be apparent herein, means other than slots may be used for applying the required torque.

The principles and features of the present invention will be more readily understood from the following detailed description, read in conjunction with the accompanying drawings.

DESCRIPTION OF THE DRAWINGS

FIG. 3b is a front elevation view of the barrel assembly of FIG. 3a;

FIG. 4b is a side elevation view in cross-section of the housing of FIG. 4a;

FIG. 6a is an exploded perspective view of the barrel assembly of the present invention and the connector housing therefor;

FIG. 6c is an exploded perspective view of the barrel assembly of FIG. 6a;

FIG. 7a is a side elevation view of the barrel assembly of FIG. 6a;

FIG. 7b is a front elevation view of the barrel assembly of FIG. 7a;

DETAILED DESCRIPTION

Figure 1:
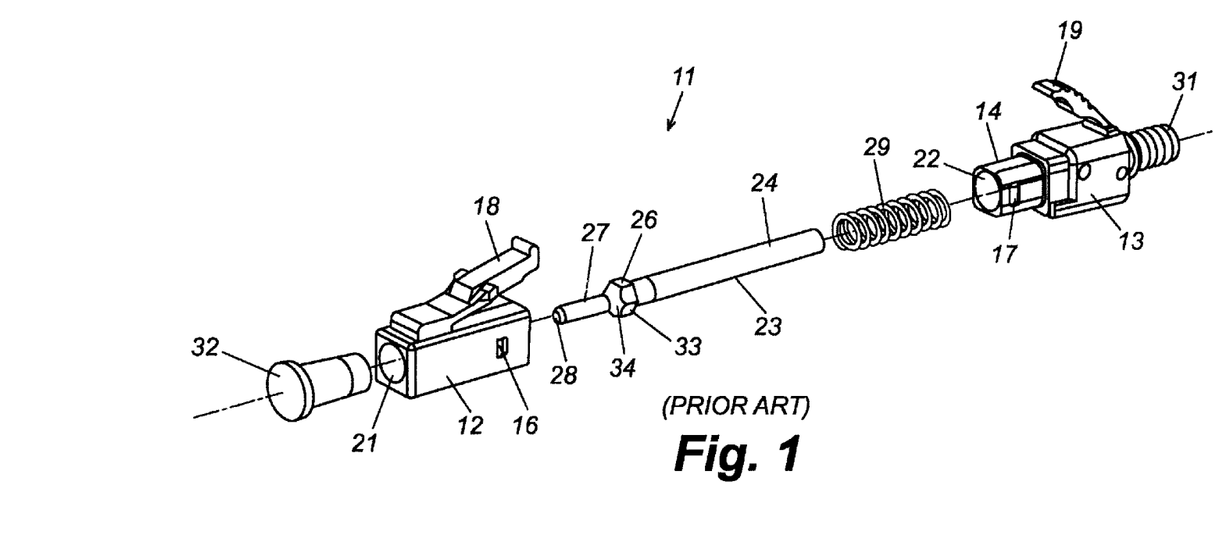
FIG. 1 is an exploded perspective view of a prior art optical fiber connector.

FIG. 1 is an exploded perspective view of the principal components of an LC type connector 11 as disclosed in the aforementioned U.S. patent applications and U.S. Pat. Nos.

5,481,634 and 6,155,146. It is to be understood that the principles of the present invention are also applicable to other types of connectors, such as an ST, SC, or others amenable to modification to incorporate these principles. Connector 11 comprises a plug housing formed of a front section 12 and a rear section 13 having an extended portion 14 which fits into section 12 and latches thereto by means of slots 16—16 in front section 12 and latching members 17—17. Members 12 and 13 are preferably made of a suitable plastic material. Front section 12 has a resilient latching arm 18 extending therefrom for latching the connector 11 in place in a receptacle or adapter. Rear or section 13 has extending therefrom a resilient arm or trigger guard 19, the distal end of which, when the two sections 12 and 13 are assembled, overlies the distal end of arm 18 to protect it from snagging and to prevent nearby cables from becoming entangled. Usually latch arm 18 and guard 19 are molded with their respective housing sections 12 and 13, respectively, and form "living hinges" therewith, which enable them to be moved up and down between latching and unlatching positions. Front section 12 has a bore 21 extending therethrough which, when the parts are assembled, is axially aligned with a bore 22 extending through rear section 13. The bores 21 and 22 accommodate a barrel assembly 23 which comprises a hollow tubular member 24 having a bore 25 (shown in FIG. 3a) extending therethrough and having a ferrule holding apparatus shown here as an enlarged flange or barrel member 26 from which extends a ferrule 27 which may be made of a suitably hard material such as, preferably, ceramic, glass, filled-plastic, or metal. Ferrule 27 has a bore 28 extending therethrough for receiving and holding an optical fiber therein. When the connector 11 is assembled, a coil spring 29 surrounds the tubular portion 24 of the assembly 23, with one end bearing against the rear surface of flange 26 and the other end bearing against an interior shoulder in rear section 13, as will best be seen in subsequent figures.

In practice, the uncoated portion of the optical fiber is inserted into bore 28 of ferrule 27 and adhesively attached thereto. Spring 29 is compressed as the sections 12 and 13 are connected and supplies a forward bias against the rear of flange 26 and, hence, to ferrule 27. This arrangement of ferrule 27 and spring 29 is considered to be a "floating" design. Prior to connection, the spring 29 causes ferrule 27 to overtravel its ultimate connected position. When connector 11 is connected within a suitable adapter and the distal end of ferrule 27 butts against the corresponding ferrule end of another connector or of other apparatus, spring 29 will be compressed, thereby allowing backward movement of ferrule 27 to where its end, and the end of the abutting ferrule, lie in the optical plane (transverse centerline) between the two connectors.

Figure 2:
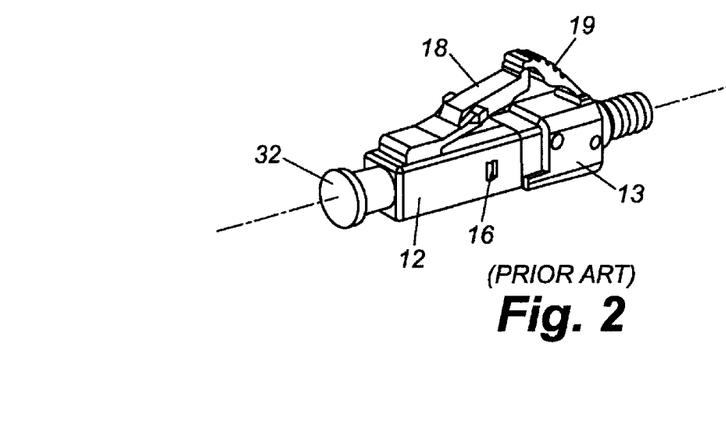
FIG. 2 is a perspective view of the connector of FIG. 1 as assembled.

The rear end of rear section 13 has a ridged member 31 extending therefrom for attachment of optical fiber cable and a strain relief boot, not shown. For protection of the distal end of ferrule 27 during handling and shipping, a protective plug 32, sized to fit within bore 21, is provided. FIG. 2 depicts the assembled connector 11 in its shipping or handling configuration.

Figure 3A:
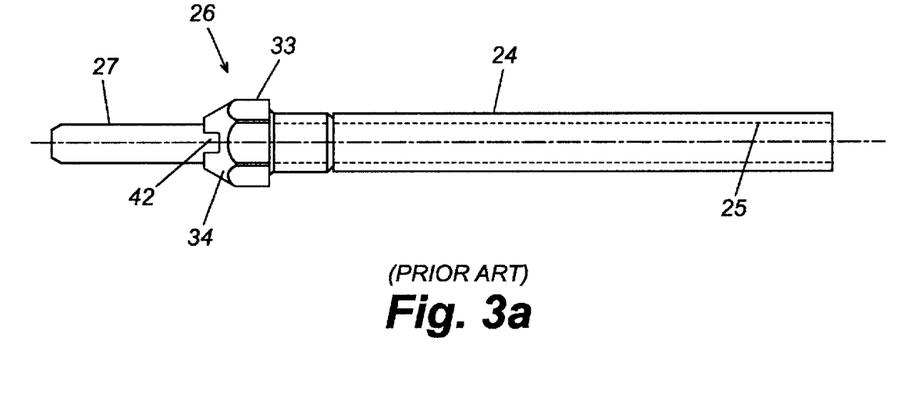
FIG. 3a is a side elevation view of the barrel assembly of the connector of FIG. 1.
Figure 3B:
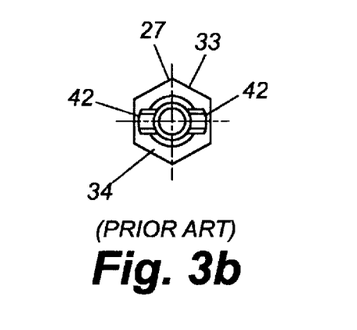
Figure 4A:
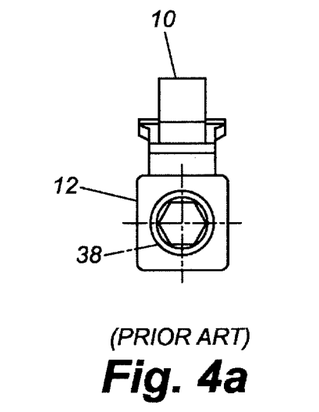
FIG. 4a is a front elevation view of the connector housing the connector of FIG. 1.
Figure 4B:
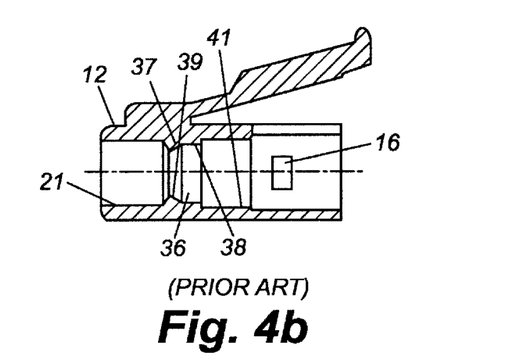

As best seen in FIGS. 3a and 3b, flange 26 has a hexagonally shaped portion 33 and a front a tapered seat portion 34 which can be a tapered extension of the hexagonal portion. While the following discussion relates to a multi-faceted ferrule holding member, it is to be understood that the term "faceted" is intended to include other locating arrangements such as, for example, slots or splines, such as are shown in, for example, the U.S. Pat. No. 6,155,146 patent. As best seen in FIGS. 4a and 4b, front section 12 has a flange seating cavity 36 formed in a transverse wall 37 thereof which has a hexagonally shaped portion 38 and a tapered portion 39 dimensioned to receive and seat tapered portion 34 of flange 26. That portion 41 of bore 21 immediately to the rear of portion 38 has a diameter sufficient to allow rotation of flange 26 when it is pushed to the rear against spring 29 and disengaged from the flange seating cavity 36. Thus, as will be discussed more fully hereinafter, when flange 26 is pushed to the rear it may be rotated and, when released, re-seated by spring 29 with tapered portion 34 acting as a guide and centering arrangement. The hexagonal configuration makes it possible to seat the flange 26 in any of six angular rotational positions, each sixty degrees (60°) apart. It has been found that a flange having fewer than six sides cannot be rotated in the assembled connector unless the diameter of bore portion 41 is increased because the diagonal of a four sided flange is too great for rotation of the flange. However, increasing the diameter of portion 41 seriously weakens the walls of the housing section 12. Further, in the tuning of the connector it has been found that six sides gives a more accurate tuning for reduction of insertion loss. The use of a flange with more than six sides is possible, and gives an even greater tuning accuracy by creating smaller increments of rotation. However, the increased accuracy is not sufficiently great to justify the increased difficulty in achieving a stable and firm seating of the flange. As the number of flange sides is increased, the periphery thereof approaches a circular configuration, which would possibly be rotatable even when seated. As a consequence, it has been found that a six sided flange is optimum.

FIGS. 3a and 3b show a modification of a barrel-ferrule assembly 23 in which the sloped or tapered seat portion 34 has a notch or notches 42 therein for accommodating a tuning tool which is shown in, for example, U.S. Pat. No. 6,155,146.

Figure 5A:
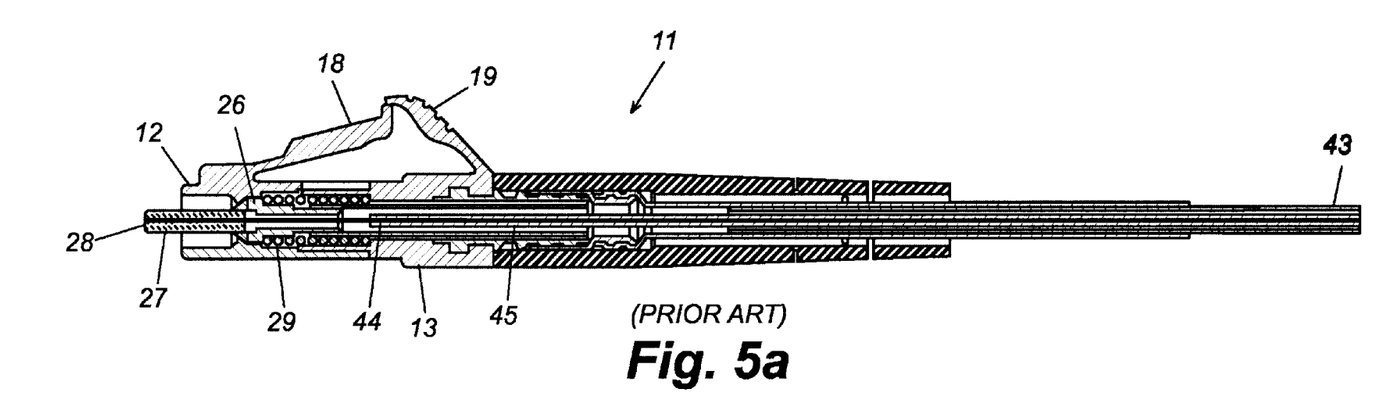
FIGS. 5a and 5b are side elevation views in cross-section of the connector of FIGS. 1 and 2 showing two-stages in the tuning thereof.
Figure 5B:
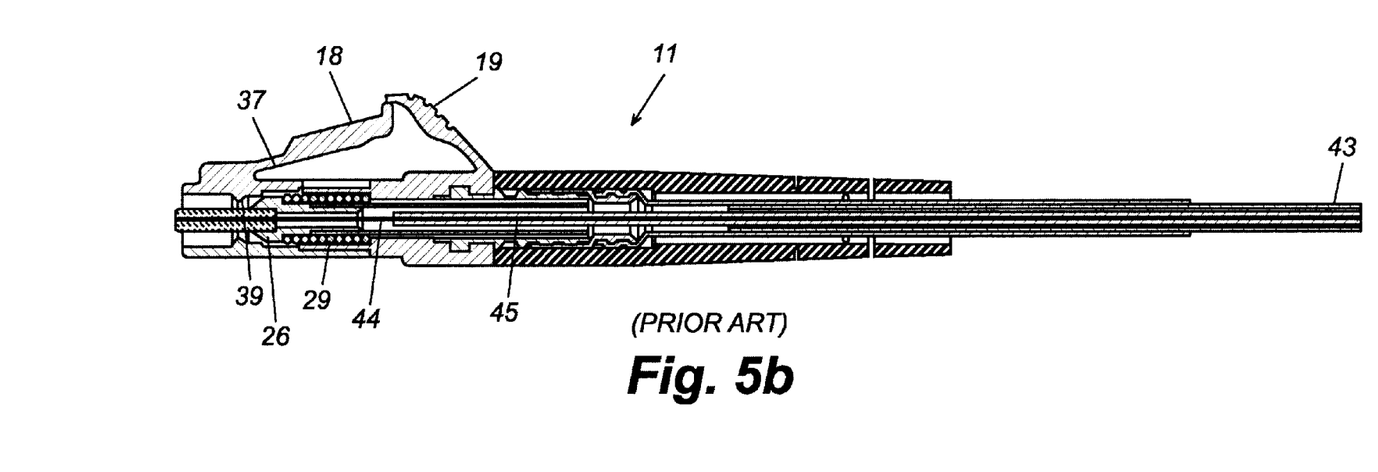

FIGS. 5a and 5b depict, in cross-section, the connector 11 showing, in FIG. 5a, the flange in seated position and in FIG. 5b, the disengaged and rotatable position of the flange for tuning, demonstrating how tuning is achievable with a fully assembled connector. It should be noted that the flange seating cavity 36 formed by the hex-shaped portion 38 is slightly more than that of the hex-shaped portion 33 of flange 26, thereby insuring that flange 26 can be disengaged (pushed back) from the flange seating cavity 36 to where it can be rotated without causing spring 29 to bottom. Connector 11 is shown mounted on the end of a cable 43 containing a fiber 44, which extend through connector 11 as shown. Note, the fiber coating and 0.9 mm buffer 45 that surrounds the fiber 44 will normally abut the entry funnel of the ferrule, but it has been shortened in FIGS. 5a and 5b for clarity.

Figure 6A:
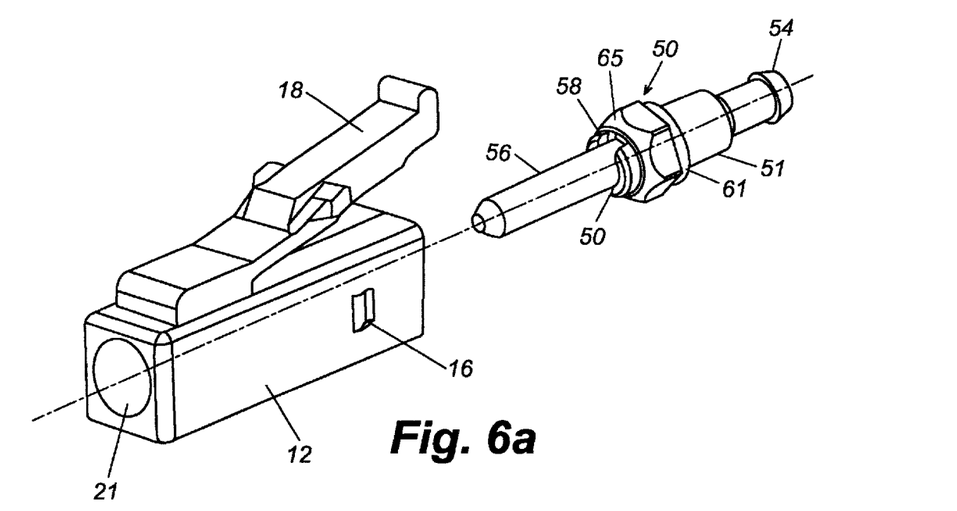
FIG. 6a is a perspective view of the barrel assembly of the present invention.
Figure 6B:
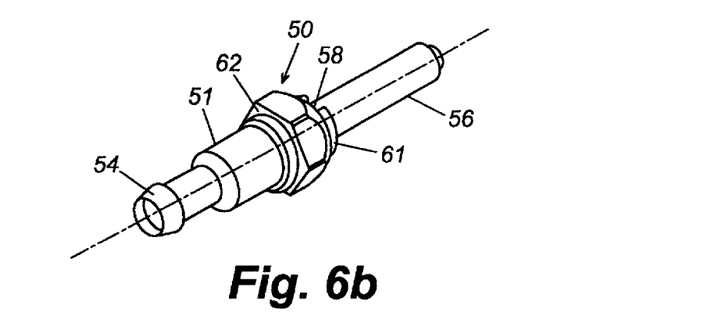
Figure 6C:
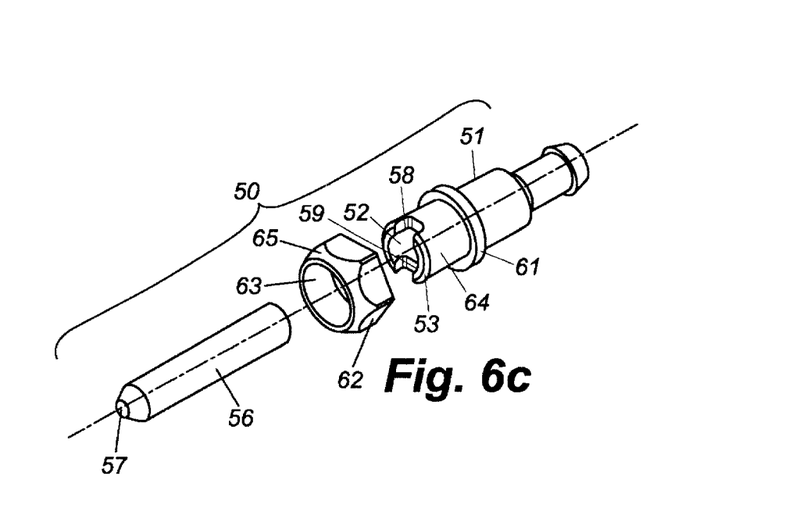

FIG. 6a is a perspective view of the barrel assembly 50 and connector housing which embodies the features and principles of the present invention; FIG. 6b is a perspective view of barrel assembly 50 as viewed from the cable end; and FIG. 6c is an exploded perspective view of barrel assembly 50. The connector housing has front section 12 and a rear section 13 which is the same as shown in FIG. 1. For simplicity, only front section 12 is shown in FIG. 6a. Barrel assembly 50 comprises a tubular member 51 having a bore 52 extending therethrough from the connector end 53 (also referred to as the ferrule receiving end) to the cable receiving end 54. Member 51 may be made of any suitable material such as plastic or metal having sufficient strength to hold a fiber-containing ferrule 56 which is a hard press fit in bore 52. Ferrule 56 may be of metal, ceramic, or other suitable material and has a bore 57 extending therethrough which is at least approximately axially aligned with bore 52, within which the optical fiber, not shown, is affixed, as by cementing. Connector end 53 has first and second tuning elements such as notches 58 and 59, on opposite sides of the ferrule the function of which will be discussed hereinafter. A flange 61 protrudes from the outer surface of tubular member 51 which, as will be apparent hereinafter, functions as a stop for an enlarged hexagonal nut 62 which has a bore 63 therein of a diameter to make the nut a light press fit on the surface 64 of member 51 between the tuning notches 58, 59 and the flange 61. Flange 61 also serves as the forward seat for spring member 29. It is to be understood that a tuning means other than notches 58 and 59 may be used, such as, for example, tangs instead of notches. By "hard" press fit is meant a fit so tight that it is difficult to impart relative movement between the parts such as ferrule 56 into bore 52 even with the application of extreme magnitude of torque, while "light" press fit such as the hex-nut 62 onto the flange surface 64 is a fit which is tight enough to withstand forces normally encountered during usage, but in which relative movement of the parts may be had with applications of heavy torque, but not extreme magnitudes thereof. Nut 62 can have a tapered front section 65 which functions as a guide, in configuration with tapered recess 39, in the housing 12, to guide the barrel 50 into its seated position within the housing.

Figure 7A:
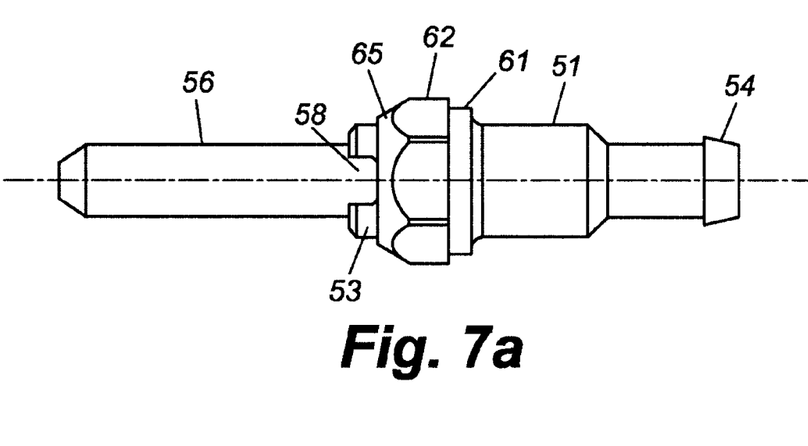
Figure 7B:
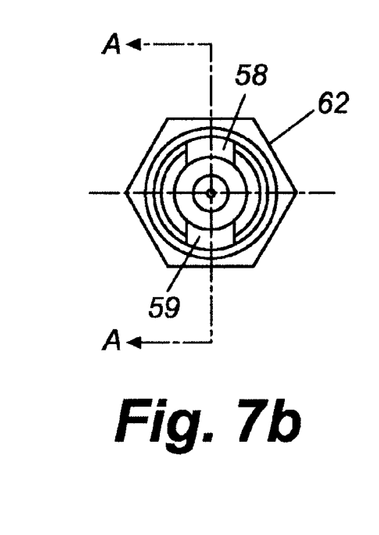
Figure 7C:
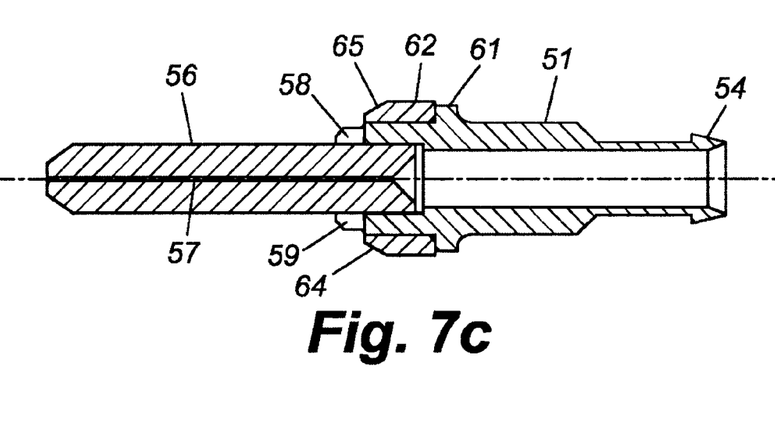
FIG. 7c is a side elevation cross-sectional view of the barrel assembly of FIG. 7a along the line A—A of FIG. 7b.
Figure 8:
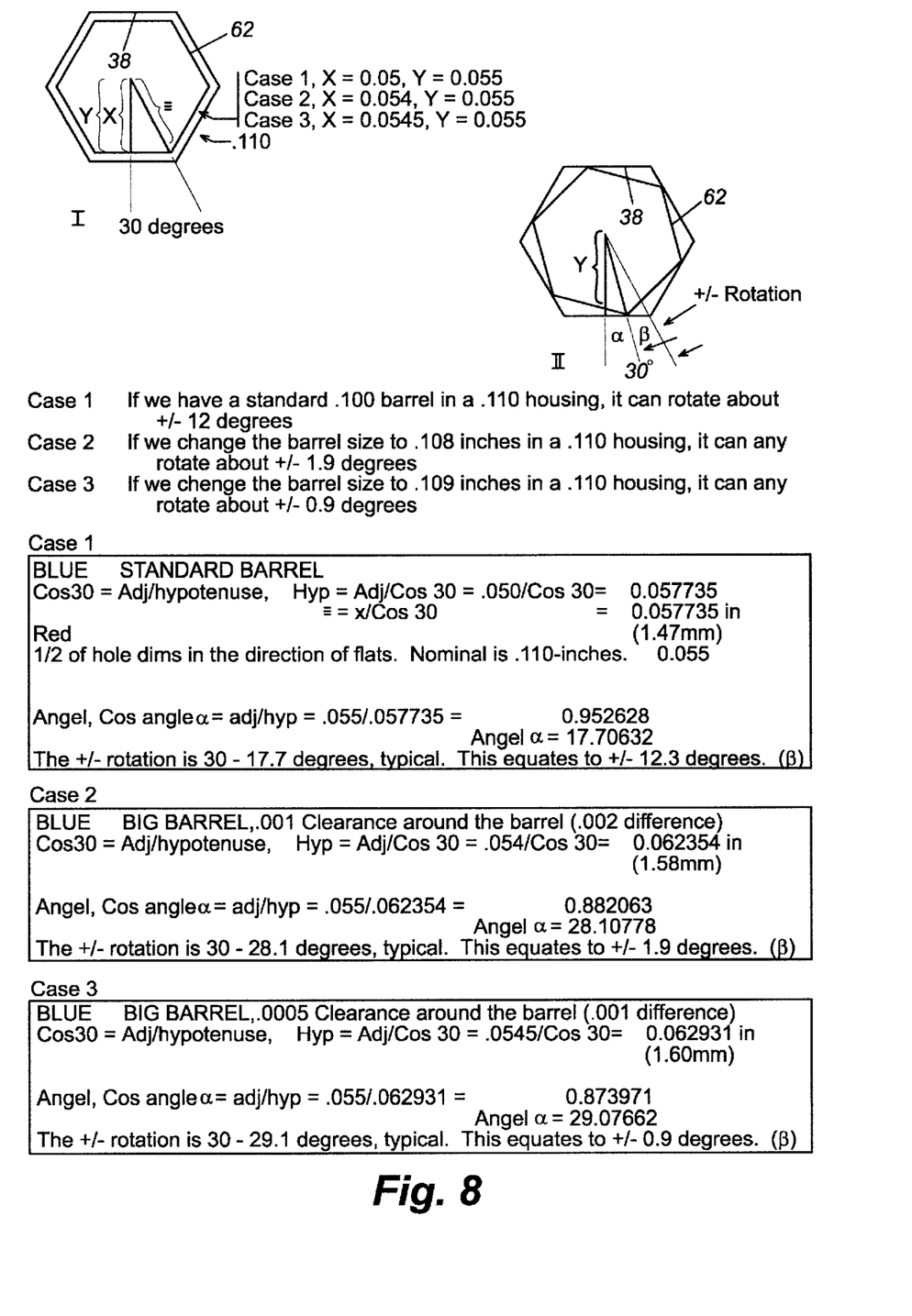
FIG. 8 is a diagram and table illustrating one feature of the present invention.

As can be seen in FIGS. 6a and 6b, and in FIGS. 7a, 7b, and 7c, the assembled barrel resembles the barrel assembly 23 of FIG. 1, however, it differs therefrom in several important particulars, certain ones of which are shown in FIG. 8, which is a diagram and chart demonstrating one of the features of the present invention.

FIG. 8 illustrates three cases, (1, 2, and 3) for the hex nut 62 within the hexagonal portion 38 of the flange seating cavity 36 of the front section 12 of a standard housing, as shown in FIGS. 4a and 4b, and illustrates the dependency of the "float" on the dimensions of nut 62 and portion 38 of flange seating cavity 36. As can be seen in diagram I and II, the nut 62 can be considerably rotated within portion 38. In a standard housing, the distance from the centerline thereof to one of the flats of portion 38 is approximately 0.055 (Y) inches, and with a standard hex nut or barrel (Case 1) the distance from the centerline thereof to one of the flats is approximately 0.050 (X) inches. The distance from the centerline to one of the points of the nut, distance Z, is determinative of how much the nut may be rotated within the housing. For each of cases 1, 2, and 3 of FIG. 8, this distance is determined as follows. The angle between an unrotated nut pointed and the midpoint of adjacent flat in the housing is 30°, and together sides X and Z, forms a right triangle, with Z as the hypotenuse. The length of Z is determined by dividing side X by cos 30°, which yields, in case 1, Z=0.057735. When nut 62 is rotated through an angle β to where the hypotenuse strikes the flat of the housing, a second right triangle is formed with sides Y and Z, and an angle α is shown to be approximately 17.7° and thus β (the angle of rotation or float) is approximately 12.3 degrees. For standard installations, as discussed hereinbefore, this is a tolerable deviation from the ideal of zero rotation. However, for a jumper test cable, or PM fiber connectors this is an intolerable amount of float. The process is repeated for cases 2 and 3 wherein it is shown that there is a drastic decrease in float for small incremental increases in the dimensions of nut 62. If the barrel or hex-nut dimension X is increased to 0.108 inches (Case 2) within a standard 0.110 housing, it can be seen that the float is limited to ±1.9 degrees and if the barrel or hex-nut dimension X is increased to 0.109 inches (Case 3) where it is virtually a slip fit within the hexagonal seating cavity in the housing, (Case 3) the float becomes ±0.9 degrees. Thus, for a jumper test cable, a range of from 0.0005 inches to 0.001 inches yields a float of from ±0.9 degrees to ±1.9 degrees which results in an accurate, precise jumper test cable for tuning connectors which, because of the decreased float, is not susceptible to excess movement from the precise (or near precise) alignment.

For PM connectors, it is desirable to limit crosstalk to −30 to −25 dB for most purposes. Rotational misalignment of 2-degrees yields a crosstalk of approximately −30 dB. Of course, consideration is given to crosstalk by all kinds of perturbations along the fiber, fiber irregularities, pressures from the coatings and cabling; and to positioning both PM connectors in their respective ports in the adapter. Here the LC benefits from a square connector housing that tapers to the front; and a tapered square cavity of the receptacle of the adapter that results in easy assembly and a close fit.

While this feature of the present invention has been demonstrated with a hexagonal nut and housing chamber, it is to be understood that similar results, using similar calculations, may be achieved with other shapes.

Figure 9:
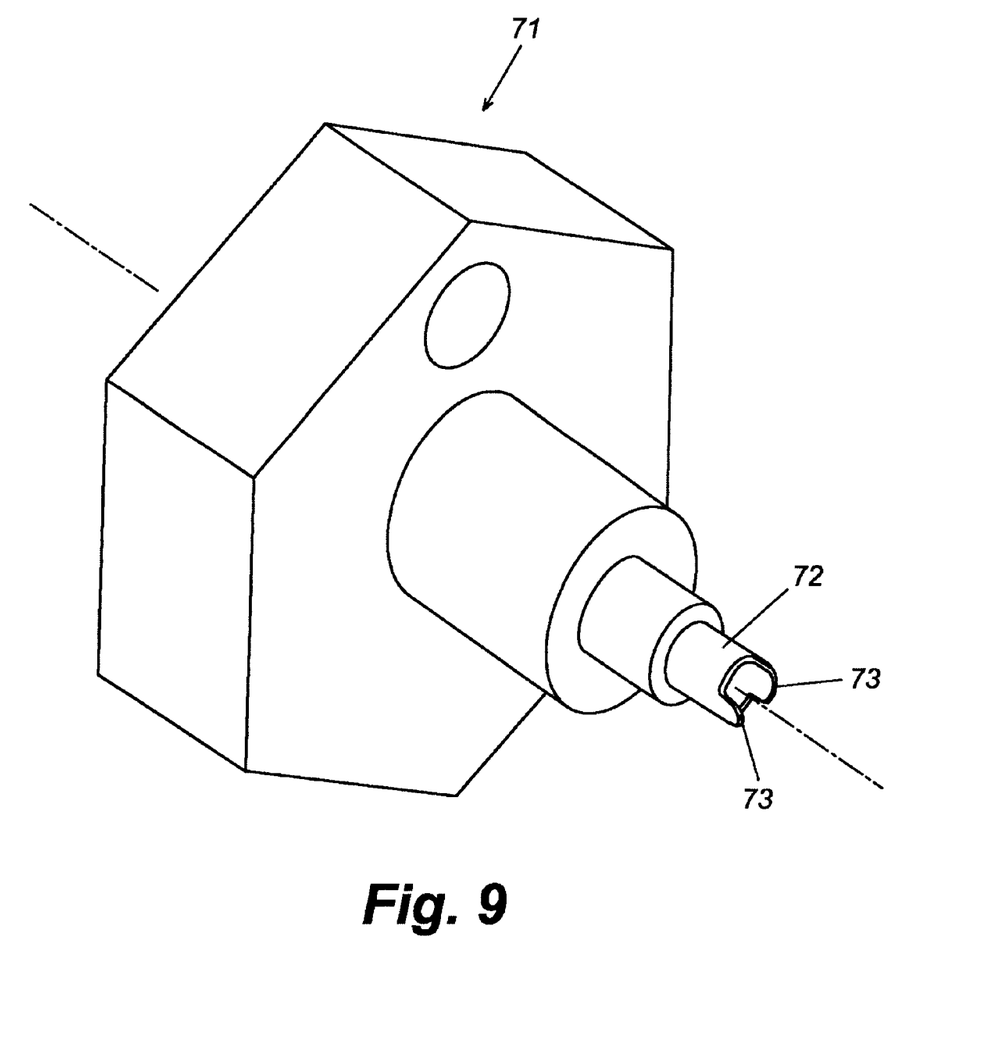
FIG. 9 is a perspective view of a tuning wrench for use with the connector of the invention.

FIG. 9 is a perspective view of a tuning wrench 71 such as is shown and described in U.S. Pat. No. 6,155,146. The operation of the wrench is also fully described in that patent. Wrench 71 has a tubular member 72 which fits over the ferrule of the connector and tangs 73 which fit into slots or notches 58 or 59 in tubular member 51 of the barrel assembly of FIGS. 6 and 7. The operation will be discussed more fully hereinafter.

It should be noted that vision system technology can identify the magnitude and direction of the fiber core to ferrule O.D. (outside diameter) eccentricity vector. Tuning the connector of this invention can then be accomplished in a semi-automatic or automatic means. The following paragraph describes the current connector tuning state-of-the-art with the manual tuner, plus a scenario for fine tuning the connector of this invention.

Figure 10:
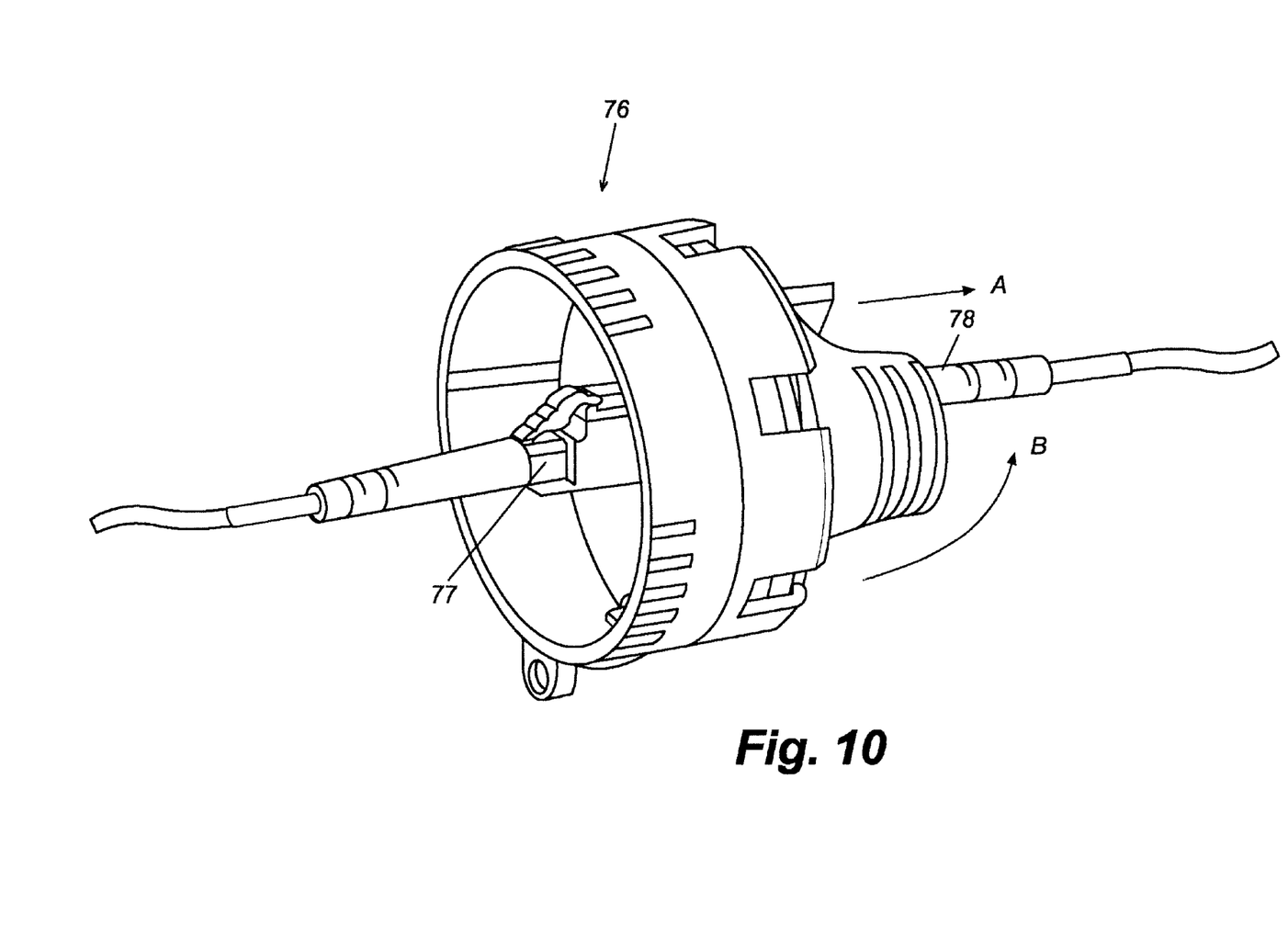
FIG. 10 is a perspective view of a tuning tool as used with the connector of the present invention.

FIG. 10 is a perspective view of the tuning index tool 76 which is shown and described in U.S. Pat. No. 6,155,146 with the connector 77 of the invention, which is to be tuned and calibrated inserted in one side thereof and a known test jumper cable and connector 78 inserted in the other side thereof. As explained fully in the aforementioned '146 patent, the test jumper connector has a known magnitude of eccentricity and zero degrees of rotation relative to the vertical axis of the adapter within the tool 76 into which it is inserted. In operation, the ferrules of the connectors 77 and 78 are abutting within tool 76 and an insertion loss measurement is made. The ferrules are then disengaged and the adapter holding the test jumper 78 is rotated sixty degrees in the direction of arrow B, for example, the ferrules re-engage and another measurement made. The process is continued with the measurements being made at rotation points sixty degrees apart until the degree of rotation that produces the minimum measured insertion loss is determined. The tuning tool indicates the number of degrees of rotation (in sixty degree increments) necessary to achieve the minimum. The tuning wrench of the '146 patent is then used to disengage and rotate the barrel assembly, as shown in FIGS. 5a and 5b, the number of sixty degree increments determined so that the angular orientation of the eccentricity of the connector being tuned is substantially zero, or vertical. As discussed hereinbefore, the final orientation is not precise inasmuch as sixty-degree increments were used. Further, with prior art connectors; a large amount of "float" is present. In normal usage, the tuning of the connector is adequate, but it is not nearly precise enough for the connector to be used to terminate a test jumper cable connectors or PM fiber connectors. The barrel assembly 50 of the present invention reduces the "float" to within tolerable limits for a test jumper connector and also makes it possible to tune the connector so precisely that it is readily usable as a test jumper. Also, for some applications, a higher degree of precision and accuracy is desirable, such as with PM fiber connectors. With the barrel of the present invention, after the desired sixty degree increment is found, the connector is disengaged from the tuning tool and the tuning wrench is used to apply torque to the tubular member 51 of sufficient amount to move it slightly relative to the hex nut 62 which remains seated within its housing, after which another loss measurement is made. This step is repeated with only slight changes each time in the relative orientation of tubular member 51 and hex nut 62 until the minimum insertion loss or crosstalk measurement is obtained. The press fit of nut 62 on surface 64 of member 51 is sufficient to resist any accidental or incidental forces and thus it remains set in the proper position. If desired, the hex nut may be cemented in place on the tubular member. Further, there is very little "float", as pointed out hereinbefore, thus the connector is precision tuned to a degree which permits its use as a termination for test jumper cables or PM fiber connectors, and it retains this precision for a relatively long useful life.

It is to be understood that the various features of the present invention lend themselves to use in other types of optical fiber connectors, and that other modifications or adaptations might occur to workers in the art. All such variations and modifications are intended to be included herein as being within the scope of the present invention as set forth. Further, in the claims hereafter, the corresponding structures, materials, acts and equivalents of all means or step-plus-function elements are intended to include any structure, material, or acts for performing the functions in combination with other elements as specifically claimed.

What is claimed is:

1. For use in an optical fiber connector, a barrel assembly comprising:
   a tubular member having a cable receiving end and a connector end, and a first bore having a central axis extending therethrough from one of said ends to the other;
   a ferrule having an axis mounted in said bore at said connector end having a fiber bore extending therethrough approximately axially aligned with the axis of said first bore; and
   a tuning member having a bore therein dimensioned to make said tuning member a light press fit on said tubular member, said tubular member being rotatable with respect to said tuning member.

2. The barrel assembly as claimed in claim 1 wherein said tubular member has a flange thereon spaced from said connector end and defining a surface on said tubular member upon which said tuning member fits.

3. A barrel assembly as claimed in claim 1 wherein said tubular member has a first notch in the connector end of said tubular member.

4. A barrel assembly as claimed in claim 3 wherein said connector end of said tubular member has a second notch, said first and second notches being on opposite sides of said tubular member axis.

5. A barrel assembly as claimed in claim 1 wherein said tuning member comprises a nut having a periphery on which is arrayed a plurality of flats.

6. A barrel assembly as claimed in claim 5 wherein said nut has six flats symmetrically arrayed about the periphery.

7. A barrel assembly as claimed in claim 5 wherein said nut has a rear surface which bears against said flange and a tapered front surface.

8. A tunable optical fiber connector comprising:
   a housing member having a front section having a connector end and a rear section and having a bore extending axially therethrough from one of said sections through the other;
   a barrel assembly comprising an elongated tubular member axially positioned within said bore and having a ferrule holding portion at a first end thereof adjacent said connector end of said first section, said barrel assembly having a connector end and a cable receiving end;
   said housing member having a cavity with a portion having a non-cylindrical surface;
   a ferrule mounted in said ferrule holding portion and extending from said connector end of said front section;
   said tubular member having a flange member spaced from said first end and defining a mounting surface;
   a tuning nut having a non-cylindrical surface on the periphery thereof and a mounting bore for mounting said nut on said mounting surface, said mounting bore diameter and said mounting surface diameter being such as to make the nut a light press fit on said mounting surface sufficient to hold said nut in place on said tubular member and to allow rotation of said tubular member relative to said nut upon application of torque thereto;
   said nut having the non-cylindrical outer surface restrained in an axial direction within the housing member, and having a rear surface bearing against said flange and a tapered front surface;
   the non-cylindrical surface of the cavity in said bore in said front section having a nut containing portion corresponding to said non-cylindrical surface on said nut; and
   spring means for maintaining said barrel assembly seated within said housing during use.

9. An optical fiber connector as claimed in claim 8 wherein said tuning nut has six flats on the periphery thereon and said nut containing portion has six flats therein.

10. An optical fiber connector as claimed in claim 9 wherein said flats on said nut are symmetrical about the axis of said barrel assembly.

11. An optical fiber connector as claimed in claim 10 wherein the distance from the axis of said tubular member to the center of one of the flats on said nut differs from the corresponding distance to the center of one of said flats in said bore in said housing by less than 0.001 inches.

12. An optical fiber connector as claimed in claim 8 wherein said bore in said housing has a tapered seating portion for receiving the tapered front surface of said nut.

13. An optical fiber connector as claimed in claim 8 wherein said tubular member has a tuning element at the said first end thereof.

14. An optical fiber connector as claimed in claim 13 wherein said tuning element is a tuning notch.

15. An optical fiber connector as claimed in claim 13 wherein said tubular member has first and second tuning notches at the said front end thereof located on opposite sides of said ferrule holding portion.

* * * * *